April 22, 1924.

O. W. HOWARD

PLOW

Filed Oct. 9, 1922

Inventor:
Otis W. Howard
by L. C. Shonts Atty.

April 22, 1924.

O. W. HOWARD

PLOW

Filed Oct. 9, 1922

INVENTOR.
Otis W. Howard
BY L.C. Shorts
ATTORNEYS.

April 22, 1924.

O. W. HOWARD

PLOW

Filed Oct. 9, 1922

Inventor:
Otis W. Howard
by L. C. Shonts
Atty.

Patented Apr. 22, 1924.

1,491,607

UNITED STATES PATENT OFFICE.

OTIS W. HOWARD, OF MOLINE, ILLINOIS, ASSIGNOR TO MOLINE PLOW COMPANY, INCORPORATED, OF MOLINE, ILLINOIS, A CORPORATION OF VIRGINIA.

PLOW.

Application filed October 9, 1922. Serial No. 593,174.

*To all whom it may concern:*

Be it known that I, OTIS W. HOWARD, a citizen of the United States, residing at Moline, county of Rock Island, State of Illinois, have invented certain new and useful Improvements in Plows, of which the following is a specification.

The invention relates to plows.

In certain countries, plowing is done, at times, with oxen and, at other times, with horses. When horses are used, the draft line is relatively low, being from the horses' collars to the plow hitch. When oxen are used, the draft is relatively high, being from the yoke carried by the oxen to the plow hitch. When oxen are used, it has been found desirable to have the plow wheels as far forward as possible, but when horses are used, these wheels must be farther to the rear. It has been the usual practice to provide separate plows, under these circumstances, that is, one plow to be used with horses and the other plow to be used with oxen.

The present invention is directed toward making a plow, which may be used either with oxen or horses.

The general object of the invention is to provide an improved plow of the type described.

A more specific object is to provide a plow, which may be easily adapted for use with either oxen or horses without the addition to or the change in any of the parts.

Other objects and advantages of the invention will hereinafter appear.

An embodiment of the invention is illustrated in the drawings in which,

Figure 3 is a perspective view of the plow with the parts in the position shown in Figure 2.

Figure 1:
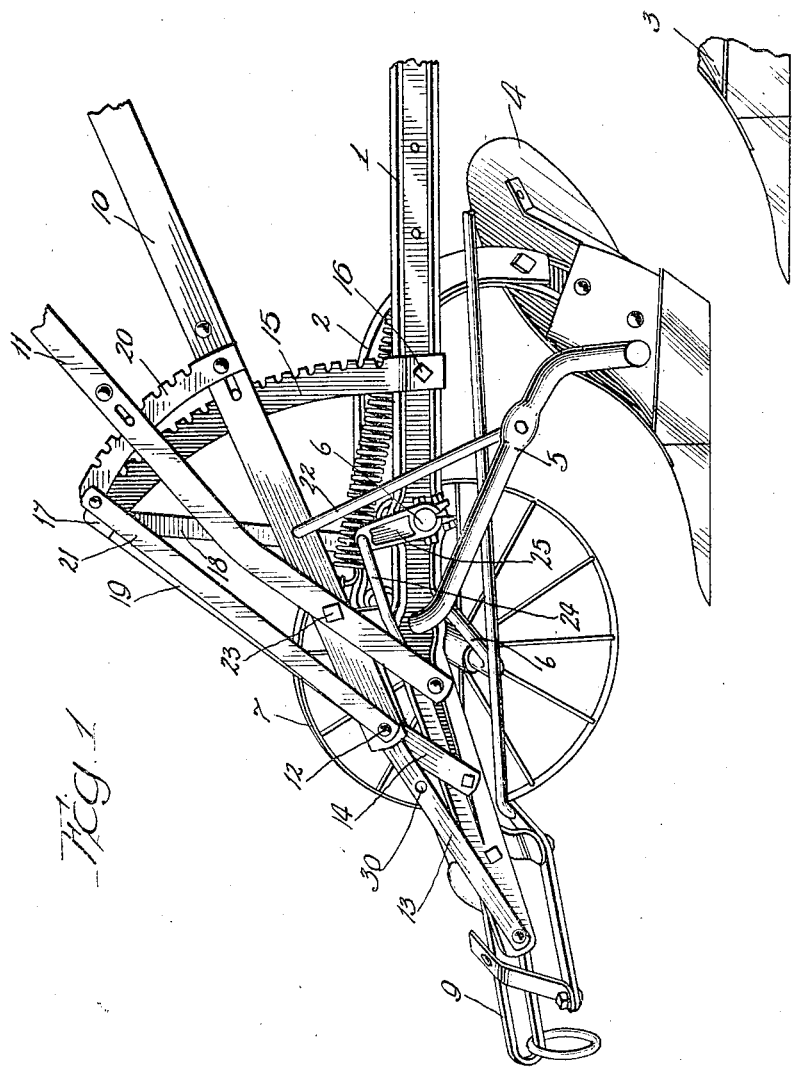
Figure 1 is a side view of the plow with the parts in the position they occupy when the plow is to be used with horses.

The plow has beams 1 and 2 carrying plow bodies 3 and 4. The beams are connected together by suitable braces and act as a framework for the support of the adjusting levers and other connections.

The beams are supported by a land wheel crank axle 5 carrying a land wheel, not shown, and a furrow wheel crank axle 6 carrying the furrow wheel 7. These crank axles are journaled directly in openings in the beam, so that the beams themselves form the bearings and it is not necessary to attach separate parts to act as bearings for the crank axles. The openings for the two axles are separated, as illustrated in the drawings.

Figure 3:
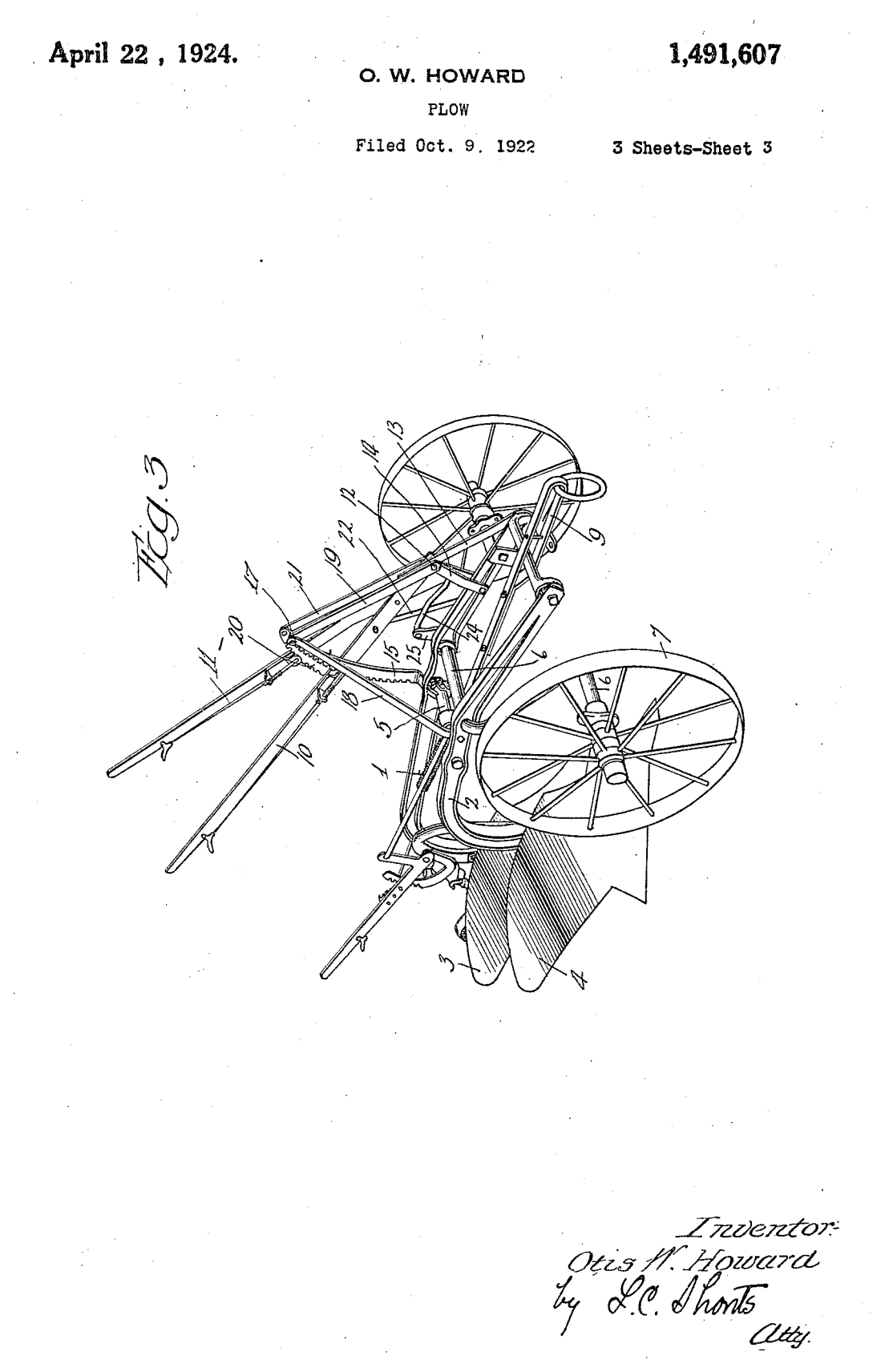

The draft is transmitted to the plow through a draft bar 9, extending rearwardly and connected to one of the crank axles, preferably the rear one, as illustrated in Figure 3.

The crank axles are swung relative to the beams for raising and lowering the plow bodies by means of a lever 10 and they are adjusted relative to one another by means of a lever 11.

The lever 10 is pivoted at the point 12 to links 13 and 14 fixed to the beam 1. It operates over a toothed sector 15 fixed at the end 16 to the beam and braced at the end 17 by a brace 18 connected to the opposite beam and by a brace 19 connected with the other parts at the pivot point 12. The lever 10 carries with it, a second toothed sector 20 connected by a link 21 with the pivot point 12. The lever 10 is connected to crank axle 5 by means of a link 22.

The lever 11 for adjusting the crank axles relative to one another operates over the sector 20, it being pivoted at the point 23 to the lever 10 and being connected by a link 24 to a crank 25 on the crank axle 6.

The operation of this mechanism, as shown in Figure 1, is as follows:

When the lever 10 is moved, it swings about the pivot 12, thereby moving the link 22 and swinging the crank axle 5. Movement of this lever carries with it, the sector 20 and the lever 11, thereby moving the crank 6 through the medium of the link 24 and the crank 25. For example, if the lever 10 is moved downwardly from the position shown in Figure 1, the crank axle 5 is moved clockwise to raise the land side of the plow. This movement of lever 10 causes the pivot point between the lever 11 and the link 24 to move downwardly and forwardly, thereby moving the crank 25 and crank axle 6 in a counter-clockwise direction to raise the furrow side of the plow.

If it is desired to adjust the furrow wheel crank axle relative to the land wheel crank axle, the lever 11 may be used for that purpose, such lever pivoting about the point 23 and swinging the crank axle directly through the medium of link 24 and crank 25.

Raising and lowering of the plows may be effected by adjusting the lever 10, no matter what the adjustment of lever 11 may be. If the lever 11 is adjusted so that the furrow wheel is in its lowest position, then, when the lever 10 is operated, the furrow wheel will be moved more rapidly than would be the case if it were adjusted to its highest position, so that the final result in raising the plows is to bring the two axles to substantially the same relative position.

The plow, as illustrated in Figure 1, is in a suitable position for use with horses, that is, the land wheel crank axle normally extends rearwardly. When it is desired to use the plow with oxen, it is desirable to have the wheels farther forward. This may be accomplished by changing the positions of some of the parts.

Figure 2:
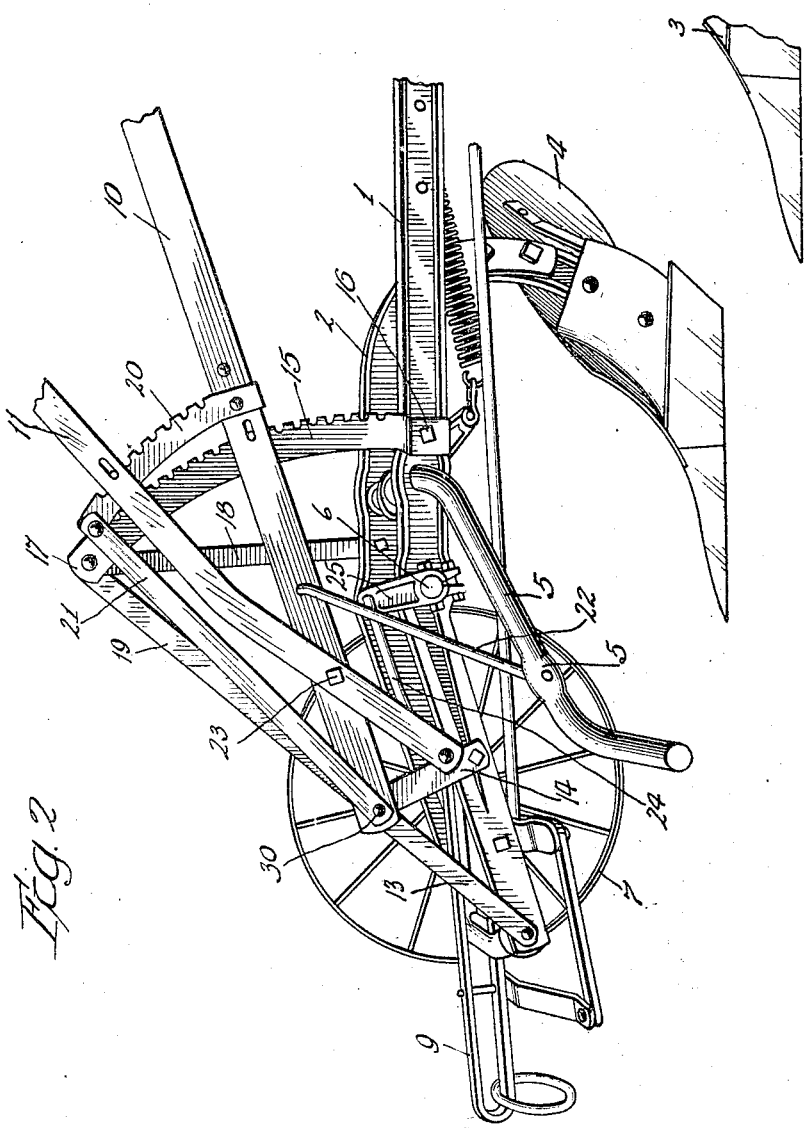
Figure 2 is a side view of the plow with the parts in the position they occupy when the plow is to be used with oxen.

The link 22 is disconnected from the crank axle 5 and the link 24 from the crank 25. The crank axles 5 and 6 are then interchanged, that is, crank axle 6 is brought forward and mounted in the bearings previously occupied by crank axle 5, while crank axle 5 is moved rearwardly to the bearings previously occupied by crank axle 6. Crank axle 6 is swung forward to the position shown in Figure 2, so that it normally extends forward. The pivot point 12 is moved downwardly on link 13 and the parts reconnected through the hole 30 in that link. This shifts the entire lever mechanism forward slightly and relocates the parts relative to the beams, so that the levers will operate satisfactorily. The links are then reconnected to the crank axles. The new positions of the parts are clearly illustrated in Figure 2.

This change in location of the parts shifts both of the wheels forwardly, that is, the furrow wheel has been shifted forward from the rear bearing to the front bearing, and, while the land wheel crank axle has been moved backward, the land wheel is, nevertheless, farther forward because the normal position of the crank axle 5 has been changed, that is, it now extends forwardly instead of rearwardly.

The wheel support for the plows is thus shifted farther to the front.

This adaptation of the plows from one form to another can be quickly and easily made without the addition of or change in any of the parts. It is simply necessary to interchange the mountings of the crank axles, shift the position of the adjusting lever slightly, and reconnect the parts. One plow may thereby be used where two plows were previously employed.

It is to be understood that the structure shown is for purposes of illustration only and that variations may be made in it without departing from the spirit and scope of the invention.

I claim:

1. A frameless plow having plow beams carrying plow bodies, an integral crank axle pivoted to the plow beams and having a downwardly extending arm on the end of which is a crank wrist carrying a ground wheel, and means carried by the plow beams and connected to the crank axle to swing the axle on its pivot to raise and lower the plow, said swinging means and the crank axle being constructed and coordinated so that the crank axle can be positioned with its arm normally inclined forwardly or normally inclined rearwardly, said swinging means serving, in either position, to swing the crank axle toward a vertical position to raise the plow.

2. A plow having plow beams carrying plow bodies, a crank axle pivoted to the beam and having a downwardly extending arm with a crank wrist on its end carrying a ground wheel, and means including a member connected to the arm of the crank axle for swinging the crank axle to raise and lower the plow, said crank axle and swinging means being constructed and coordinated so that the crank axle can be positioned with its arm normally inclined forwardly or normally inclined rearwardly, said swinging means serving to move the crank axle toward a vertical position from either of its normal positions.

3. A frameless plow having plow beams carrying plow bodies, an integral crank axle mounted directly in openings in the plow beams and having a downwardly extending arm with a crank wrist on its end carrying a ground wheel, a lever mechanism mounted on the plow beams and connected to the crank axle, said lever mechanism and the crank axle being constructed and coordinated so that their positions may be changed with the crank axle either normally inclined forwardly or normally inclined rearwardly, said lever mechanism serving to swing the crank axle to a vertical position from either of its inclined positions to raise the plow.

4. A plow having plow beams carrying plow bodies, a furrow wheel crank axle carrying a furrow wheel, a land wheel crank axle carrying a land wheel, a lever mechanism for swinging both of said axles to raise and lower the plow including a lever for adjusting one of the axles relative to the other, said lever mechanism and the crank axles being constructed and coordinated with each other and with the plow beams so that one of the crank axles can be positioned to normally incline forwardly or to normally incline rearwardly, said lever mechanism serving, in both cases, to move both the crank axles toward a vertical position for raising the plow.

5. A plow having plow beams carrying plow bodies, a furrow wheel crank axle carrying a furrow wheel, a land wheel crank axle carrying a land wheel, a lever mechanism for swinging both of said crank axles to raise and lower the plow including a lever for adjusting the crank axles relative to one another, said lever mechanism and crank axles being constructed and coordinated so that the crank axles can be interchanged in their mountings on the beam with one of the axles inclined forwardly in one of its mounted positions and inclined rearwardly in its other mounted position, said lever mechanism being available for swinging the crank axles and adjusting them relative to one another in all the mounted positions of the crank axles.

6. A plow having plow beams carrying plow bodies, a furrow wheel crank axle journalled to the plow beams and having an arm extending forwardly and downwardly carrying a furrow wheel, a land wheel crank axle journalled on the plow beams in front of the mounting of the furrow wheel crank axle, said land wheel crank axle having an arm extending downwardly and rearwardly and carrying a land wheel, a lever mechanism connected to the crank axles for swinging them to raise and lower the plow, said mechanism including a lever for adjusting the crank axles relative to one another, said crank axles and lever mechanism being constructed and coordinated so that the crank axles may be interchanged in their pivotal mountings to the plow beams with the furrow wheel crank axle pivoted to the beams in front of the land wheel with its arm extending forwardly and downwardly, and the land wheel crank axle mounted to the rear of the furrow wheel crank axle with its arm extending forwardly and downwardly, said lever mechanism being adjustable so that it will operate to swing the crank axles and to adjust them relative to one another in both of the positions of the said crank axles.

7. A plow having plow beams, a furrow wheel crank axle mounted directly in openings in the beams, a land wheel crank axle mounted directly in openings in the beams, means for adjusting one of the crank axles relative to the other, and means for swinging the crank axles to raise and lower the beams, all of said elements being constructed and coordinated to permit each of the crank axles to be mounted in the openings for the other so that one of them may normally extend forward or normally extend rearward.

In testimony whereof, I affix my signature.

OTIS W. HOWARD.